Patented Feb. 25, 1936

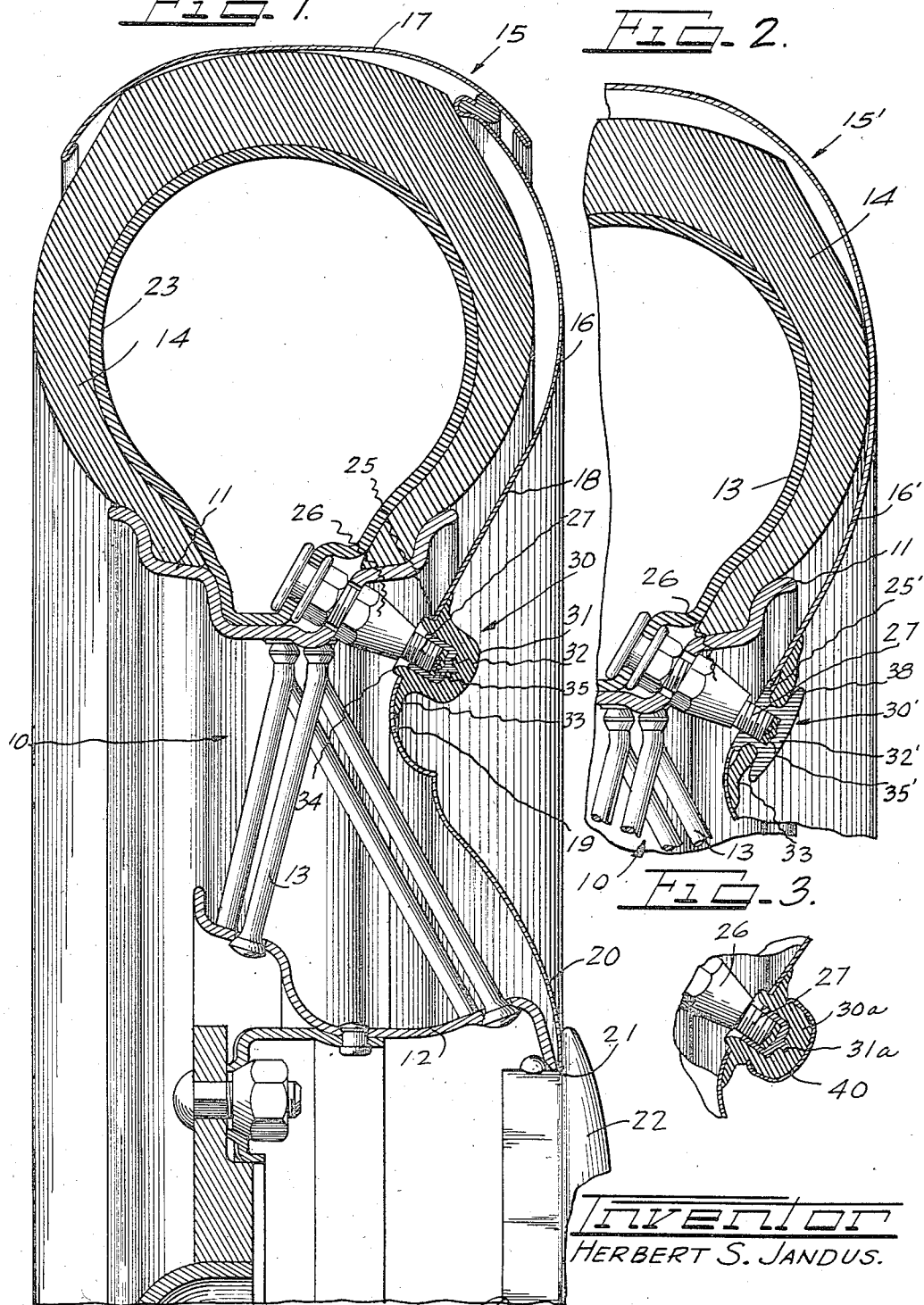

2,031,955

UNITED STATES PATENT OFFICE 2,031,955

VALVE CAP FOR USE WITH WHEEL OR TIRE COVERS

Herbert S. Jandus, Detroit, Mich., assignor to Lyon Cover Company, Detroit, Mich., a corporation of Michigan Application November 6, 1933, Serial No. 696,752

4 Claims. (Cl. 150—54)

This invention relates to inner tube valve stem caps and more particularly to a valve stem cap for use with wheels having a cover plate thereon.

An object of this invention is to provide an improved valve stem cap which in addition to its usual function of enveloping the end of the valve stem also serves as an instrumentality for pressing a wheel or tire cover inwardly toward the wheel.

Another object of this invention is to provide a valve stem cap adapted to have a cushioned engagement with a wheel cover plate.

With the advent of the use of spare tire covers of the so-called drum type, considerable trouble has been experienced in getting to the valve stem when it is desired to further inflate the spare tire. Unless an opening was provided in the drum cover to get to the valve stem, it has heretofore been necessary to remove the drum cover from the spare tire before access could be had to the valve stem.

It is, accordingly, the aim of this invention to provide a spare wheel installation including a wheel and tire cover thereon with means which will readily afford access to the valve stem without necessitating removal of the cover from the wheel and which normally renders the valve stem invisible from the exterior of the cover.

It is also the aim of this invention to accomplish the aforesaid desired result through the instrumentality of a novel valve stem cap which is of such formation and inherent construction as to press the cover inwardly toward the wheel when the cap is tightened on the stem as well as to have a yieldable contact with the cover about an opening therein through which the valve stem projects.

In accordance with the features of this invention, there is provided a wheel installation including a laterally projecting valve stem which extends through an opening in a cover plate disposed over an outer side of the wheel and on the free end of which is disposed a cap embodying the features of this invention and which has its marginal portion in engagement with the cover plate about the valve stem opening therein.

In accordance with other features of this invention, I have provided a number of different forms of valve stem caps all of which, however, embody a marginal flange portion made of a resilient or flexible material so as to have a cushioned contact with the wheel cover when the cap is tightened into position on the free end of the valve stem.

Other objects and features of this invention will more fully appear from the following detail description taken in connection with the accompanying drawing, in which—

Figure 1 is an enlarged fragmentary cross-sectional view taken through a spare wheel installation and embodying the features of this invention, wherein a valve stem cap of my construction is shown in cooperation with the free end of the valve stem and a wheel cover plate.

Figure 2 is also an enlarged fragmentary sectional view illustrating a modification of the invention.

Figure 3 is a fragmentary sectional view taken through a still third form of the invention.

As shown on the drawing:

The reference character 10 designates generally a spare wheel which includes a tire rim 11 of the drop center type and a wheel hub 12 connected to the tire rim 11 by the usual spokes 13. This wheel may be of any usual or conventional construction.

Mounted on the rim 11 is a spare tire 14 over which is disposed a spare tire cover of the same general type as that shown in George Albert Lyon Letters Patent No. 1,807,697. This tire cover 15 includes a side plate or disc 16 disposed over an outer side wall of the spare wheel and tire and held in proper position by a split tread covering part 17 which, as is fully disclosed in the aforesaid Lyon patent, is expansible and contractible for removal and application to the tire. When the tread covering part or rim 17 is in the position shown, it is in retaining cooperation with the side plate 16.

Of course, it is to be understood that my invention is not limited to this specific type of tire cover but may be used with equal advantage with other tire cover constructions irrespective of whether the cover be a one-piece cover or a two-piece cover.

The side member 16 of the cover is in the form of a ring-like disc and is shaped generally to conform with the outer contour of the tire 14 and wheel 10. This disc embodies a tire side covering portion 18 bulged inwardly at 19 and terminating centrally of the wheel in an outwardly bulged portion 20 formed with a central opening 21 for accommodating the skirt of a hub cap 22. This construction enables the hub cap to clampingly secure the central part 20 of the cover plate 16 to the wheel hub 12 as is evident from the drawing. The wheel may be attached by any suitable or conventional means to a support on the vehicle.

The inwardly bulged annular portion 19 of the side plate or drum 16 has an opening 25 through which projects the threaded free end 27 of a valve stem construction 26. This valve stem construction 26 may be of any suitable or conventional form and is connected in the usual way to the wheel rim 11 and the inner tube 23 of the tire 14.

Threadingly and detachably secured to the free end 27 of the valve stem construction 26 is a cap 30 embodying the features of this invention. This cap, as shown in Figure 1, embodies a centrally apertured portion 31 having disposed therein and secured thereto a threaded bushing to receive the threaded free end 27 of the valve stem. The cap 30 is also provided with a marginal and yieldable flange 33 for contacting the outer surface of the cover part 16 about the opening 25. Moreover, the cap 30 is also provided with an inwardly extending annular skirt 34 for telescoping the opening 25. This skirt engages the edge of the opening 25 and functions to resist any tendency of the valve cap to unscrew from the valve stem.

The entire cap 30, in the form of the invention shown in Figure 1 with the exception of the metallic bushing 32, is made of a yieldable or resilient material, such, for example, as soft rubber, molded rubber and the like. It is feasible to employ a phenolic condensation material in this cap where a high degree of flexibility is not desired.

It will be evident from the disclosure in Figure 1 that the cap 30 is adapted to be screwed on the end 27 of the valve stem 26 into a position in which its peripheral flange 33 not only conceals the opening 25 in the cover plate 16 but also presses against the cover plate to aid in pressing the cover plate toward the wheel and tire. The flexibility of the flange 33 is such that the cap may readily adapt itself to a variety of cover shapes and positions. Also, it is only necessary to unscrew this valve cap and inflate the tire in the ordinary way without necessitating any removal of the spare tire cover from the wheel assembly.

Furthermore, if it is so desired, the metallic bushing 32 may have disposed therein a rubber disc 35 against which the extreme outer end of the threaded valve stem end 27 is adapted to abut.

In the form of the invention shown in Figure 2, a modified type of spare tire cover is illustrated as being applied to the spare tire 14 which is disposed on the rim 11 of the spare wheel 10.

In this form of the invention the cover is designated generally by the reference character 15' and is illustrated as being a one-piece construction. This cover, however, like the form shown in Figure 1, embodies a drum or side plate 16' having a valve stem opening 25' through which the free end 27 of the valve stem 26 projects.

The modified form of cap 30' is shown threaded on the free end 27 of the valve stem. This cap 30' embodies a metallic central member 32' which is internally threaded to receive the free end 27 of the valve stem. A rubber cushioning disc 35' may be disposed inside the disc member 32' for abutting the extremity of the valve stem end 27. Encircling this central member 32' is a ring-like flexible or resilient member 33' which may be made of any suitable material, such, for example, as soft rubber. This resilient ring-like member 33' performs the same function as the marginal flange 33 of the first form of the invention shown in Figure 1. If it is so desired, the member 32' may have its outermost peripheral edge 38 knurled or formed into the shape of a bolt head facilitating the manual turning of the cap. It should also be noted that the central portion 31 of the cap shown in Figure 1 may have its external surface similarly formed to facilitate manual turning of it.

In the form of the invention shown in Figure 3, there is illustrated a valve stem cap 30a which is substantially identical with the cap 30 with the exception that the central part 31a is enveloped by a metallic shell or cup which may be made from stainless steel or from any other metal having an appropriate finish such, for example, as a chromium plated surface. This shell or metallic cup is designated by the reference numeral 40. With this exception, this form of the invention is substantially like and functions in the same way as the cap shown in Figure 1.

Now I desire it understood that while I have illustrated and described in detail the preferred forms of this invention, the invention is not to be thus limited but only insofar as defined by the scope and spirit of the appended claims.

I claim as my invention:

1. As an article of manufacture, a valve stem cap centrally threaded to be screwed over the free end of the stem and having an enlarged marginal portion for engagement with a wheel cover plate about a valve stem opening therein, said cap having an annular skirt extending inwardly from said marginal portion for telescoping the valve stem opening and also having its centrally threaded portion externally enveloped by a metallic cup.

2. In combination, a wheel including a laterally projecting valve stem, a detachable cover plate for disposition over an outer side of the wheel and having an opening through which said valve stem extends, and a cap disposed over the free end of said valve stem and having its marginal portion in engagement with said cover plate about the valve stem opening therein, said cap being formed to be tightened on said valve stem to press the cover plate inwardly toward the wheel and to aid in centering the plate on the wheel during application of the plate thereto.

3. In combination, a wheel including a laterally projecting valve stem, a detachable cover plate for disposition over an outer side of the wheel and having an opening through which said valve stem extends, and a cap disposed over the free end of said valve stem and having its marginal portion in engagement with said cover plate about the valve stem opening therein, said cap being formed to be tightened on said valve stem to press the cover plate inwardly toward the wheel and to aid in centering the plate on the wheel during application of the plate thereto, and having a marginal flange made of yieldable material so as to have a cushioned engagement with said cover plate.

4. As an article of manufacture, a valve stem cap centrally threaded to be screwed over the free end of the stem and having an enlarged marginal portion for engagement with a wheel cover plate about a valve stem opening therein, said cap also having an annular skirt extending inwardly from said marginal portion for telescoping said valve stem opening.

HERBERT S. JANDUS.